Nov. 10, 1925.
L. T. FREDERICK
COMPOSITE GEAR
Filed June 18, 1924
1,561,222
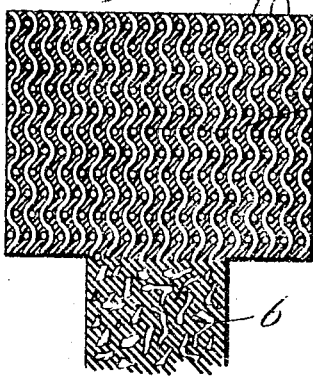
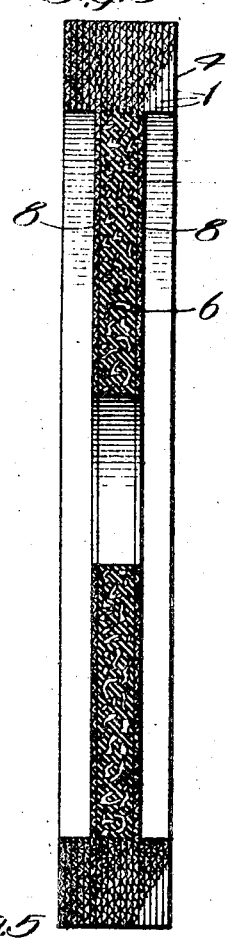
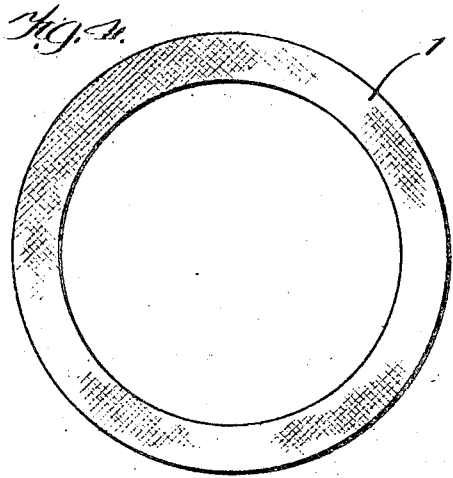
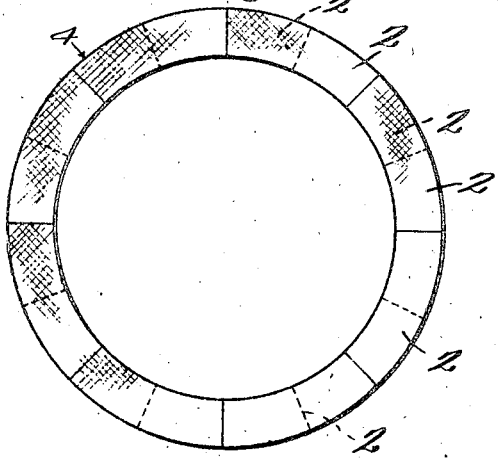
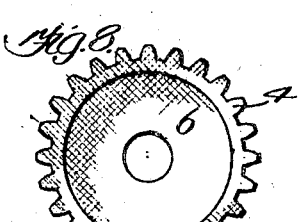
Inventor:
Louis T. Frederick Patented Nov. 10, 1925.

1,561,222

UNITED STATES PATENT OFFICE.

LOUIS T. FREDERICK, OF VALPARAISO, INDIANA, ASSIGNOR TO FIBROC INSULATION COMPANY, OF VALPARAISO, INDIANA, A CORPORATION OF INDIANA.

COMPOSITE GEAR.

Application filed June 18, 1924. Serial No. 720,776.

*To all whom it may concern:*

Be it known that I, LOUIS T. FREDERICK, a citizen of the United States, residing at Valparaiso, in the county of Porter and State of Indiana, have invented a certain new and useful Improvement in Composite Gears, of which the following is a specification.

My invention relates to gearing, particularly of that class made from composite material and frequently known as "silent gears." Such gears are composed usually of woven fabric and "condensation product" frequently called "synthetic resin" and produced by reacting formaldehyde upon phenolic bodies. The strongest and most durable of such composite gears are those in which the layers of canvas or other fabric are arranged in the form of laminations parallel to the plane of the gear. Such gears are expensive, however, owing in part to the amount of fabric which is wasted in trimming. The object of my invention is to produce a gear which will have the same strength and length of life as those gears in which the layers are parallel to the plane of the gear, but which may be produced more economically.

Generally speaking I accomplish my object by constructing a gear in which the rim is composed of layers of fabric united by condensation product and the web is composed of a cheaper material but one possessing adequate strength and durability and capable of being formed at the same time and at the same operation as the rim and capable of making a unitary structure with it.

I accomplish my object in the manner illustrated in the accompanying drawings in which—

Figure 1 is a diametral sectional view of a gear embodying my invention.

Figure 2 is a fragmentary section on an increased scale showing the rim and a portion of the web.

Figure 3 is a diametral section of a gear wheel of modified form in which the web portion is faced by sheets of woven fabric.

Figure 4 is a face view of a fabric ring suitable for use in my gear blank.

Figure 5 is a face view of a ring segment which may be employed in building up the gear instead of employing complete rings as shown in Figure 4.

Figure 6 is a face view of a rim built up from segments of the type shown in Figure 5.

Figure 7 is an edge view of the rim shown in Figure 6.

Figure 8 is a face view of a completed gear after the teeth have been cut in the rim.

Like numerals denote like parts throughout the several views.

According to my invention I first build up a rim section either by taking complete fabric rings 1 shown in Figure 4 or ring segments 2 shown in Figure 5. For the sake of economy of material I prefer the latter although the labor factor is somewhat increased and the choice will depend upon the particular conditions involving these factors. Where the segments are employed they are laid up in such manner that the ends in one layer will not register with the ends of the segments of the adjacent layer. In other words the segments will be staggered as illustrated in Figures 6 and 7. The fabric is saturated or impregnated with the condensation product which will act as a binder. Thus the rim section, indicated in general by reference numeral 4, is composed of laminations of woven fabric, usually canvas or duck, and a condensation product binder.

The web section 6 may consist of condensation product only. It is preferable, however, to employ a mixture of condensation product and fibrous material, especially the scrap material resulting from cutting the rings or segments which form the rim. If the scraps are not too large they may be used just as they are, otherwise they may be cut up into smaller pieces. In any event the fibrous material in the web portion will be in amorphous condition in the sense of not being in any regular arrangement. A gear constructed in this manner is shown in Figures 1 and 2. It is desirable for the sake of appearance, however, and to a slight extent for the purpose of increasing the strength of the structure, to employ facing sheets 8 as shown in Figure 3. These facing sheets are preferably of the same kind of fabric as are employed in making the rim portion, thus giving the entire gear a uniform and finished appearance. These sheets may or may not extend to the outer circumference of the rim, although in Figure 3 I have shown the facing sheets as extending completely to the outer circumference of the gear blank.

The condensation product is rendered hard, infusible and insoluble by the action of heat and pressure, and in making the gear blank I introduce the constituents into a mold or press in the manner shown either in Figure 1 or Figure 3. In this mold or press the parts are compressed and consolidated simultaneously, that is, not only will the component parts of the rim become compressed and consolidated and likewise the web, but the rim and the web will unite with each other and become consolidated into a single unitary structure. In the finished gear blank there is no line of cleavage between the rim and the web, and where facing sheets 8 are employed it is not apparent that there is any different in composition between the rim and the web. After the gear blank has been subjected to the heating or baking action for a sufficient period of time and has become properly cured, gear teeth will be cut in the rim to produce the finished gear as indicated in Figure 8.

As a result of my invention I am able to greatly reduce the cost of the gear blank without reducing its efficiency or injuring its appearance. It is the rim, of course, which is called upon to withstand the frictional contact with the cooperating gear, and the rim of my gear is composed of the same constituent elements (fabric and condensation product) as the rim of an ordinary composite gear. The web, however, is not, generally speaking, subjected to wearing action, and I have taken advantage of this fact to cheapen the cost of the article by employing in it material whose cost is considerably less than the material in the rim. Thus I am able to utilize a waste product for the web portion of the gear, thereby effecting an important saving in cost.

I have found that the life of the gear may be increased and a lubricating effect obtained by introducing graphite into the body of the gear, especially the rim portion. This may be effected in different ways. One method is to mix graphite with the phenolic condensation product prior to the time when the fabric is saturated or impregnated with it. Other methods might be employed. For example, it is possible to apply the graphite in powdered form to the surface of the layers of fabric prior to the application of the fluid condensation product. By introducing graphite in small quantities the gear has a self lubricating effect and yet its strength is not appreciably reduced. I do not herein claim this feature, as it forms the subject of a separate application, Serial No. 740,642.

Having thus described my invention what I claim as new and desire to secure by Letters Patent is:

1. A gear blank of composite material having a central web portion and a rim portion from which the teeth may be cut, the rim consisting of layers of fabric united by a condensation product and the web portion being composed of amorphous pieces of fabric irregularly arranged and condensation product, the web portion being integral with the rim portion.

2. A gear blank of composite material having a central web portion and a rim portion from which the teeth may be cut, the rim consisting of layers of woven fabric arranged parallel with the plane of the gear and united by condensation product and the web portion consisting chiefly of scraps of fabric irregularly arranged and condensation product united to and integral with the rim portion.

3. A gear blank having a central web portion and a rim portion, the rim consisting of layers of woven fabric arranged parallel with the plane of the gear and united by a condensation product, and the web having facing sheets of woven fabric and within the facing sheets a mixture of small pieces of fabric irregularly arranged and condensation product, the condensation product binding together and consolidating the facing sheets and fibrous material of the web and also uniting in a unitary structure the web with the rim.

4. A gear having a central web portion and a rim portion, the rim consisting of layers of woven fabric in the form of segments superposed in staggered relation, and the web being composed of small pieces of fabric irregularly arranged and the whole consolidated and unified by a binder capable of becoming insoluble and infusible under the action of heat.

5. The method of producing gear blanks consisting in building up a rim section of layers of woven fabric impregnated with a condensation product binder, the layers being parallel to the plane of the gear and occupying the entire rim, assembling with the rim portion entirely inside the inner diameter thereof a web portion composed of small pieces of the fabric impregnated with such binder, and subjecting all of the aforesaid constituents simultaneously to the action of heat and pressure to harden and consolidate the constituents and produce a structure in which the rim and the web are united into a single unitary structure.

6. The method of producing gear blanks consisting in building up a rim section of segmental pieces of woven fabric impregnated with a condensation product binder.

the layers contacting each other and being parallel to the plane of the gear, assembling with the rim portion a web portion composed of small pieces of such impregnated fabric irregularly arranged, and subjecting all of such material simultaneously to the action of heat and pressure to consolidate the whole into a unitary structure.

7. The method of producing gear blanks consisting in building up a rim section of segmental pieces of woven fabric impregnated with a condensation product binder, the layers contacting each other and being parallel to the plane of the gear, assembling with the rim portion a web portion composed of small pieces of such impregnated fabric irregularly arranged, placing facing sheets on the surfaces of the material and finally subjecting all of the components simultaneously to the action of heat and pressure to consolidate them and produce a unitary structure.

In witness whereof, I have hereunto subscribed my name.

LOUIS T. FREDERICK.